United States Patent Office 3,287,084
Patented Nov. 22, 1966

3,287,084
PROCESS FOR SEPARATING STRONTIUM VALUES FROM RARE EARTH METAL VALUES
Harold H. Van Tuyl, Richland, Wash., assignor to the United States of America as represented by the United States Atomic Energy Commission
No Drawing. Filed Mar. 20, 1963, Ser. No. 266,765
6 Claims. (Cl. 23—23)

The invention described herein was made in the course of, or under, a contract with the United States Atomic Energy Commission.

This invention deals with the recovery of strontium values from aqueous solutions and in particular with strontium recovery and separation from waste solutions derived from processing of nuclear reactor fuel, for instance by solvent extraction.

The isotope $Sr^{90}$, which is the isotope present in waste solutions of the above-described derivation, is a beta-emitter of relatively uniform strength due to its half-life of 28 years; it does not emit gamma rays. These characteristics make $Sr^{90}$ ideally suitable as the heat source of thermoelectric generators.

Strontium has been recovered from aqueous solutions by precipitation as the sulfate or on a sulfate carrier such as lead sulfate after any iron present had been complexed by the addition of tartrate anions. The lead sulfate carrier with the strontium was then metathesized to the carbonate. This procedure resulted in an average strontium recovery of 85%.

However, the precipitate thus obtained contained an excessively high portion of gamma-emitting rare earths, and the precipitate therefore had to be further processed for decontamination from lead and coprecipitated rare earths. For this purpose the precipitate was dissolved in acid, and oxalate ions were added, whereby lead and rare earths were precipitated. Carbonate ions were then added to the supernatant, whereby strontium was precipitated. This decontamination procedure has the drawback that it reduces the strontium yield from 85% to 70 or even 60%.

It is an object of this invention to provide a process for the recovery of a pure strontium compound from aqueous rare-earth-containing solutions by which an aftertreatment of the precipitate for decontamination from rare earths is not required.

It is another object of this invention to provide a process for the recovery of a pure strontium compound from aqueous rare-earth-containing solutions by which a comparatively high yield of strontium is obtained.

It has been found that the rare earths can be held in solution in a tartaric-complexed aqueous solution by adding hydrogen peroxide prior to the carrier precipitation of the strontium on lead sulfate. The nature of the basic reaction that is responsible for such improved results is not known to the inventor. Hydrogen peroxide alone, without tartaric acid, does not bring about this result, nor does tartaric acid alone except when a considerable excess thereof is added. However, an excess of tartaric acid is not desirable, because it results in the precipitation of a very voluminous ferric tartrate, which carries some of the strontium and contaminates the strontium.

The process of this invention thus comprises adding to an aqueous acid solution containing strontium values and rare earth metal values a water-soluble tartrate-anion-containing compound and hydrogen peroxide; incorporating a lead sulfate precipitate, whereby the strontium values are carried on said lead sulfate; and separating said precipitate from the aqueous solution.

The tartrate anion is preferably added in the form of tartaric acid; however, water-soluble tartrates are equally well suitable. The optimum concentration for the tartrate anion was found to be 0.8 mole per one liter of solution.

The effect of the pH value on the degree of strontium precipitation and decontamination was studied in a number of experiments using an aqueous synthetic solution having the approximate composition of a solvent extraction waste solution after destruction of part of the nitric acid with formaldehyde. In this synthetic solution cerium salt was used as a stand-in for the rare earths under the assumption that if separation from cerium was satisfactory, the process would perform all the better for the heavier rare earths. That this assumption is correct is shown in Example I, where a solution containing both cerium and promethium was processed by the process of this invention and where promethium was retained in solution at least as well as, or even better than, cerium. This Example I shows the effect of change of pH value on the precipitation of strontium, cerium and promethium.

EXAMPLE I

A number of runs were carried out, each time using 100 ml. of a solution 1.0 M as to $H^+$; 0.6 M as to Na; 0.5 M in Fe(III); 0.1 M in Al; 0.04 M in Cr(III); 0.02 M in Ni(II); 0.01 M in $PO_4^{\equiv}$; 1.0 M in $SO_4^=$; 1.5 M in $NO_3^-$; and tracer quantities of cerium, promethium and strontium. Twenty milliliters of sodium sulfate in the form of a 2 M aqueous solution and 20 ml. of 5 M tartaric acid were added, whereupon the pH was adjusted to the values shown in Table I. Thereafter 5 ml. of a 30% solution of hydrogen peroxide and 2 ml. of a 1 M lead nitrate solution were added. One control run was carried out without the addition of hydrogen peroxide.

The solutions were allowed to digest for one hour at 60° C., the precipitates were filtered off and the supernatants were analyzed for cerium, promethium and strontium. In all runs the strontium precipitation was 94% or more. The quantities of cerium and promethium in the precipitate obtained at the various pH ranges are shown in Table I.

Table I

| $H_2O_2$ | pH range | Percent precipitated | |
|---|---|---|---|
| | | Ce | Pm |
| 0 | 1–2.5 | >90 | >90 |
| 5 ml./l. feed solution | 2–2.5 | 0 | 0 |
| Do | 1.5 | 75 | 50 |
| Do | 1.0 | >90 | >90 |

When a similar run was carried out with a solution having a pH value of three, a decontamination factor from cerium of only two was accomplished (decontamination factor is percent of strontium in the precipitate as to that initially present in the solution:percent of cerium in the precipitate as to that initially present in the solution). These results show that the presence of hydrogen peroxide and the pH range of between 2 and 2.5 are critical. An increase of the quantity of hydrogen peroxide did not bring about any improvement.

The lead sulfate carrier can be added as such; however, it is preferred to form it in situ, because then a more complete strontium recovery is obtained. For instance, a water-soluble sulfate, such as sodium sulfate, can be added to the feed solution and a water-soluble lead salt, such as lead nitrate, can be incorporated at a later stage, for instance after pH adjustment with sodium hydroxide or the like and addition of hydrogen peroxide.

Strontium precipitation at elevated temperature is more complete than that carried out at room temperature (85% at 25° C., 91% at 60° C.), while the separation from cerium was found better at room temperature than at elevated temperature, a decontamination factor of 20 having been obtained at 25° C. and of 10 only at 60° C. Therefore a compromise has to be made in choosing the temperature according to the intended use of the product.

It is advantageous to allow a digestion period, say, of one hour for complete precipitation of the strontium prior to separation of the precipitate by customary means, such as filtration, decantation and centrifugation.

In the following, another example is given to illustrate the process of this invention.

EXAMPLE II

A set of experiments were carried out to study the effect of variables on the quantity and the purity of the product. For this purpose 100 ml. of the same feed solution as was used in Example I were processed in each experiment; the feed solution contained tracer concentrations of strontium and cerium but no promethium. Aqueous solutions of sodium sulfate (2 M) and tartaric acid (5 M) were added to each 100-ml. aliquot of feed solution in the quantities shown in Table II. The pH was then adjusted by adding an aqueous sodium hydroxide solution in each instance to the values also shown in Table II. Thereafter varying quantities of a 30% hydrogen peroxide solution were added and finally 2 ml. of a 1 M solution of lead nitrate.

The samples were allowed to digest for one hour at the temperatures shown in Table II, and the precipitates were filtered off, washed with 1 M sodium sulfate solution and thereafter with a solution 1 M in sodium hydroxide and 0.25 M in sodium carbonate. The precipitate was finally dissolved in nitric acid, and the solution formed was analyzed for strontium and cerium. Likewise, the supernatant of the precipitate was analyzed for strontium. The various conditions and results are compiled in Table II.

Table II

| pH | Milliliters Added | | | Temp., ° C. | Percent Sr in Supernate | DF from Ce in Precipitate |
|---|---|---|---|---|---|---|
| | $H_2O_2$ | $Na_2SO_4$ | Tartaric Acid | | | |
| 2 | 0 | 100 | 10 | 80 | 3.1 | 1.0 |
| 2 | 0 | 20 | 20 | 60 | 3.1 | 1.1 |
| 2 | 0 | 20 | 20 | 80 | 2.2 | 1.1 |
| 2 | 0 | 100 | 20 | 80 | 2.5 | 1.0 |
| 2 | 1 | 20 | 20 | 60 | 2.9 | 5.2 |
| 2 | 2 | 20 | 20 | 60 | 3.1 | 5.0 |
| 1.5 | 4 | 20 | 20 | 60 | 2.8 | 3.5 |
| 2 | 4 | 20 | 0 | 60 | 6.8 | 1.0 |
| 2 | 4 | 20 | 10 | 60 | 2.9 | 5.3 |
| 2 | 4 | 100 | 10 | 80 | 3.8 | 7.8 |
| 2 | 4 | 20 | 20 | 60 | 3.4 | 6.6 |
| 2 | 4 | 0 | 20 | 60 | 2.7 | 5.5 |
| 2 | 4 | 100 | 20 | 60 | 3.8 | 6.4 |
| 2 | 4 | 100 | 20 | 80 | 3.0 | 5.0 |
| 2 | 4 | 20 | 40 | 60 | 5.2 | 7.6 |
| 2.5 | 4 | 20 | 20 | 60 | 3.2 | 12 |

The above data confirm the finding of Example I that a pH value of 1.5 is too low, since it does not bring about satisfactory decontamination. The data also indicate that a pH value of 2.5 is better than that of 2.

Tartaric acid without hydrogen peroxide was not operative. The same is true for the use of hydrogen peroxide without tartaric acid, when no decontamination from cerium was obtained. A change of the quantity of hydrogen peroxide does not have any radical effect on the decontamination factor; perhaps the latter is slightly higher with the higher addition (4 ml.) of hydrogen peroxide than when only 1 or 2 ml. were added. Likewise, a change of the sodium sulfate quantity had no effect on either the strontium or the cerium precipitation; the sulfate is needed merely for the formation of the lead sulfate carrier.

All these experiments described in the above examples were carried out with synthetic feed solutions, because these are less hazardous and therefore simpler to handle.

When the process was tried with actual, radioactive, waste solutions, the results, both as to strontium recovery and decontamination, were unsatisfactory; it was ascertained that this was due to the formation of free radicals from tartrate by its reaction with hydrogen peroxide. Numerous experiments were carried out in an attempt to overcome this drawback. It was finally discovered that by adding ethylene glycol to the feed solution this undesirable side reaction did not take place and the process proceeded satisfactorily even with radioactive solutions.

The quantity of ethylene glycol found best was 2 ml. per 100 ml. of feed solution. The glycol was preferably added after the incorporation of the lead salt and about one-half hour after the addition of the hydrogen peroxide. The glycol-containing solution may then be held for digestion prior to precipitate removal, for instance for three hours at a temperature of about 60° C. Using this procedure with an actual waste solution as it was obtained by the tributyl phosphate extraction of nuclear fuel dissolver solutions, a decontamination factor from cerium of 10 was obtained when the solution had a pH value of 2.5 and of above 100 when the pH value was 3.

In order to decontaminate the strontium precipitate still further, or rid it of the carrier, it may be subjected to the aftertreatment described in the introduction of this application, comprising dissolution of the precipitate in acid, precipitation of lead and rare earths as oxalates and precipitation of strontium in the supernatant as the carbonate. However, for most purposes the process without this aftertreatment yields a product of satisfactory purity.

It will be understood that the invention is not to be limited to the details given herein but that it may be modified within the scope of the appended claims.

What is claimed is:

1. A process for separating strontium values from non-radioactive aqueous acid solutions having a pH value of between 2 and 2.5 containing said values together with rare earth metal values, comprising adding a water-soluble tartrate-anions-containing compound and hydrogen peroxide to said solution; incorporating a lead sulfate precipitate in the solution whereby said strontium values are carried on said lead sulfate; and separating the precipitate from the aqueous solution.

2. The process of claim 1 wherein the tartrate-anions-containing compound is tartaric acid, which is present in the solution in a quantity of about 0.8 mole per liter of solution.

3. The process of claim 2 wherein the lead sulfate is formed in the solution in situ by adding water-soluble sulfate and water-soluble lead salt thereto.

4. The process of claim 3 wherein the sulfate and lead salt are sodium sulfate and lead nitrate, respectively.

5. A process of separating strontium values from rare earth fission product values contained in an aqueous solution, comprising adding sodium sulfate to the solution; adjusting the pH value to between 2 and 2.5; adding tartaric acid and hydrogen peroxide thereto; incorporating lead nitrate in the solution; adding ethylene glycol whereby a lead sulfate precipitate forms and the strontium values are carried on said precipitate; and separating said precipitate from said solution.

6. The process of claim 5 wherein tartaric acid is present in a quantity of about 0.8 mole, hydrogen peroxide in a quantity of 5 ml. of a 30% solution and ethylene glycol in a quantity of 20 ml., all per liter of solution.

References Cited by the Examiner

Tompkins et al.: Paper 239 in Radiochemical Studies: The Fission Products Book 3, ed. by Couzell et al., 1st ed., McGraw-Hill Book Co., New York, 1951, pages 1470 to 1481.

Tompkins et al.: Paper No. 240 in Radiochemical Studies: The Fission Products, Book 3, ed. by Coryell et al., 1st ed., McGraw-Hill Book Co., New York, 1951, pages 1482–1488.

OSCAR R. VERTIZ, *Primary Examiner.*

H. T. CARTER, *Assistant Examiner.*